United States Patent [19]
Ranke

[11] 4,050,909
[45] Sept. 27, 1977

[54] PROCESS AND APPARATUS FOR THE PRODUCTION OF HYDROGEN AND CARBON DIOXIDE

[75] Inventor: Gerhard Ranke, Poecking, Germany

[73] Assignee: Linde Aktiengesellschaft, Hoellriegelskreuth, Germany

[21] Appl. No.: 635,041

[22] Filed: Nov. 25, 1975

[30] Foreign Application Priority Data

Oct. 30, 1975 Germany .................................. 2548700

[51] Int. Cl.$^2$ ............................................ B01D 53/00
[52] U.S. Cl. ............................................ 55/68; 55/48; 55/73
[58] Field of Search .................... 55/48, 68, 73, 51, 46, 55/223

[56] References Cited

U.S. PATENT DOCUMENTS

| 3,498,067 | 3/1970 | Ranke ................................. 55/68 X |
| 3,640,052 | 2/1972 | Kanoki et al. ...................... 55/48 X |

FOREIGN PATENT DOCUMENTS

| 832,143 | 1/1952 | Germany ............................. 55/46 |

OTHER PUBLICATIONS

"Linde Reports on Science and Technology," No. 18, of 1973, pp. 7–13.

*Primary Examiner*—Wilbur L. Bascomb, Jr.
*Assistant Examiner*—E. Rollins Cross
*Attorney, Agent, or Firm*—Millen & White

[57] ABSTRACT

For the separation of substantially pure carbon dioxide and a gas enriched in hydrogen, said gases being especially suitable for the production of urea via an intermediate ammonia synthetic and reaction with CO$_4$ a system is provided of a. scrubbing a raw gas consisting essentially of carbon dioxide, hydrogen and hydrogen sulfide in a first scrubbing stage with a first fraction of partially loaded physical scrubbing agent, e.g., methanol, to obtain a partially scrubbed raw gas depleted in H$_2$S and a more loaded scrubbing agent;

b. scrubbing said partially scrubbed raw gas in a second stage with physical scrubbing agent to obtain a further scrubbed raw gas enriched in hydrogen and said partially loaded physical scrubbing agent;

c. subjecting said more loaded scrubbing agent to at least one (preferably two) pressure reducing stages to obtain a gaseous phase therefrom;

d. subjecting a second fraction of said partially loaded scrubbing agent to at least one pressure-reducing stage to obtain reduced pressure liquid phase substantially free of hydrogen sulfide; and e. scrubbing said gaseous phase of step (c) with at least a fraction of liquid phase of step (d) to obtain a scrubbed substantially pure carbon dioxide and hydrogen sulfide.

27 Claims, 1 Drawing Figure

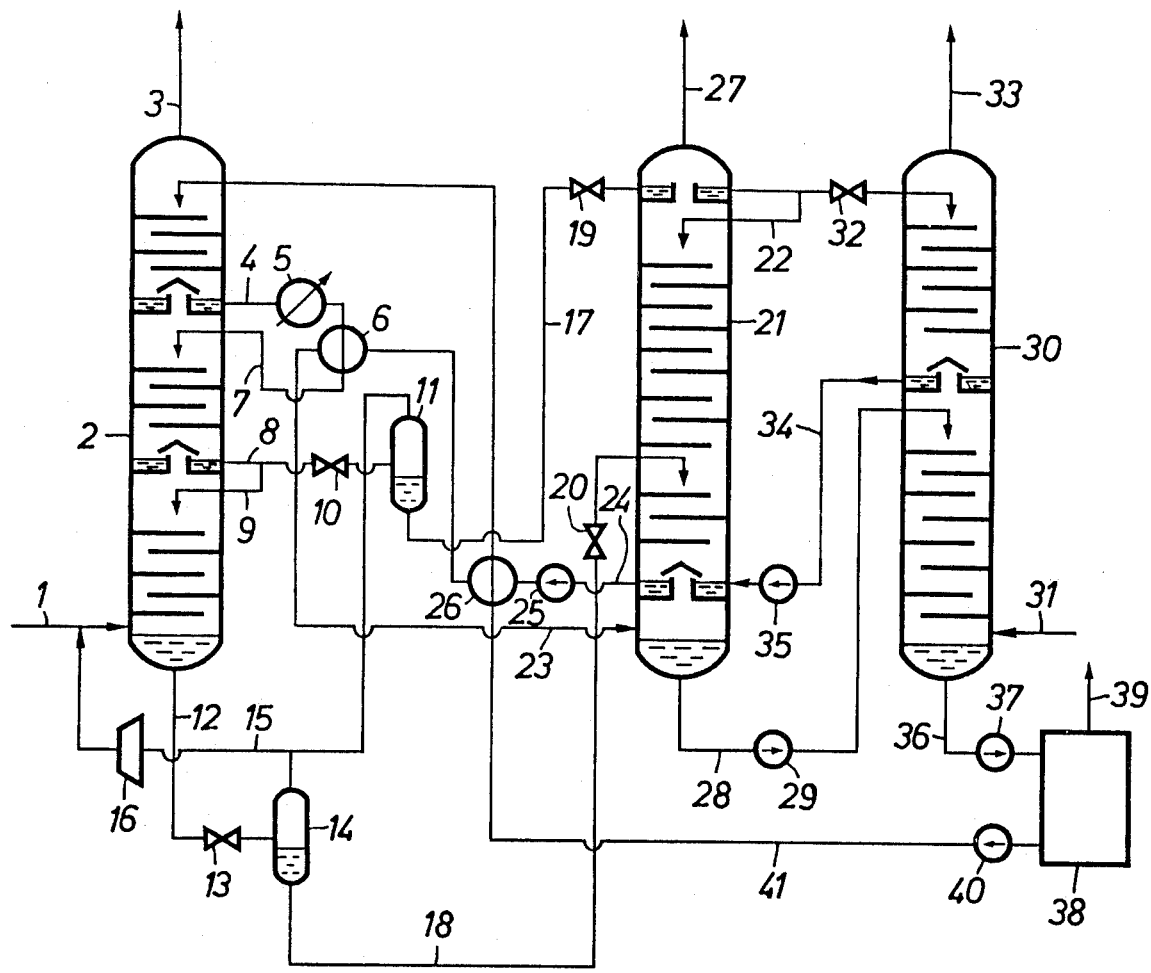

PROCESS AND APPARATUS FOR THE PRODUCTION OF HYDROGEN AND CARBON DIOXIDE

BACKGROUND OF THE INVENTION

This invention relates to a scrubbing process and apparatus for separating hydrogen and carbon dioxide from a gas containing $H_2$, $CO_2$ and $H_2S$, said process being generally conducted at low temperature.

Conventionally, crude oils, refinery residual oils, or carbon constitute raw materials for the production of hydrogen-enriched gaseous mixtures (containing in addition thereto a greater or less amount of carbon oxides) which are utilized as starting mixtures for hydrogenations, ammonia synthesis, and methanol synthesis. Ammonia can in turn be reacted with $CO_2$ to form urea. These raw materials which contain sulfur in most cases are subjected to an oxidative thermal cracking step with oxygen at an elevated temperature. After the separation of interfering components, such as carbon black tar, naphthalenes, higher hydrocarbons, and water, a gaseous mixture is then obtained consisting essentially of hydrogen, carbon monoxide, carbon dioxide, hydrogen sulfide, and traces of nitrogen, argon, and methane. If it is intended to form from this gas a starting gas mixture for ammonia synthesis or for hydrogenation hydrogen, then the carbon monoxide present in the gas is subjected to a conversion with steam, resulting in the oxidation of the carbon monoxide to carbon dioxide and the formation of additional hydrogen.

Before being employed for a synthesis, however, any such gas must be freed from the so-called "sour gas," inasmuch as the components constituting the sour gas, namely $CO_2$, $H_2S$, COS, and mercaptans, would otherwise poison the synthesis catalysts. In case of a gas wherein the carbon monoxide was subjected to a conversion to carbon dioxide, there are no COS and mercaptans present since these are reduced to hydrogen sulfide under the conditions of the conversion; accordingly, in this case, the sour gas consists essentially of $CO_2$ and $H_2S$.

To remove these sour gas components from the gaseous mixturs, so-called physical scrubbing methods have been used extensively for many years. In physical scrubbing, the sour gas components are absorbed without chemical binding and can be desorbed by expansion, heating and/or distillation. Polar organic solvents and among these particularly methanol, which can dissolve considerable amounts of sour gas at temperatures of below 10° C., are especially suitable for this purpose. In this connection, it proved to be particularly advantageous that the Henry's law constants of $H_2S$ and $CO_2$ are different so that during a physical scrubbing step the differing solubilities of $H_2S$ and $CO_2$ in the scrubbing medium can be utilized for the selective scrubbing out of $H_2S$ and $CO_2$.

Such a process is disclosed, for example, in "Linde Reports on Science and Technology" No. 18 of 1973, pages 7 to 13 incorporated by reference herein. In this conventional process, a gas consisting essentially of $H_2$, $CO_2$, and $H_2S$ is scrubbed with methanol in a scrubbing column having three stages, the gas flowing through this column from the bottom toward the top. In the lowermost stage, which is the $H_2S$ scrubbing stage, the $H_2S$ is washed out with a minor quantity of methanol loaded with $CO_2$ withdrawn from the scrubbing stage located thereabove. This step has the advantage that only a very small amount of $CO_2$ is dissolved from the raw gas at this point; consequently, the heat of solution is relatively minor. In the second scrubbing stage arranged thereabove, the primary amount of the $CO_2$ is dissolved in partially loaded methanol. The residual $CO_2$ is washed out in the uppermost section of the scrubbing column which is subjected to a spray of very cold methanol, thereby removing the substantially last traces of sour gas components from the gas, down to the range of 10 p.p.m. The methanol utilized in the top of the column is obtained by thermal regeneration.

In the conventional method, the scrubbing media of the first and second stages are expanded twice, respectively, thus liberating dissolved gases, and are then fed at different levels to an $H_2S$ enrichment column where the $CO_2$ still present in the scrubbing media is stripped out with nitrogen, and simultaneously the $H_2S$ liberated during the stripping step is reabsorbed, so that a residual gas is discharged at the head of this column consisting essentially of nitrogen and carbon dioxide. Further processing operation provides a thermal regeneration of the scrubbing media to obtain an $H_2S$ fraction and a methanol-water separation, after which the scrubbing agent is again available in regenerated form.

This conventional method works well, but for the production of urea, further difficult steps would be required to form pure $CO_2$ from the exhaust gas leaving the $H_2S$ enrichment column. Specifically, for urea production, up to approximately 75% of the carbon dioxide contained in the raw gas must be obtained in the pure form, if the hydrogen purified in such a system is scrubbed, e.g., to high purity in a subsequent liquid nitrogen washing stage and fed, after adding further nitrogen, to the $NH_3$ synthesis as a $3H_2 + N_2$ mixture ready for the synthesis, the $CO_2$ being then reacted to urea with the thus-produced ammonia.

SUMMARY OF THE INVENTION

An object of the present invention is to provide a system, including process and apparatus aspects, for producing sufficiently pure hydrogen for ammonia synthesis and, sufficiently pure carbon doxide for urea synthesis. Upon further study of the specification and appended claims, other objected aspects and advantages will become apparent.

To attain these objects, the process aspect of the invention is broadly described as: In a process for the separation of substantially pure carbon dioxide and a gas enriched in hydrogen from a raw gas consisting essentially of carbon dioxide, hydrogen and hydrogen sulfide, the steps of:

a. scrubbing said raw gas in a first scrubbing stage with a first fraction of partially loaded physical scrubbing agent to obtain a partially scrubbed raw gas and a more loaded scrubbing agent;

b. scrubbing said partially scrubbed raw gas in a second stage with physical scrubbing agent to obtain a further scrubbed raw gas enriched in hydrogen and said partially loaded physical scrubbing agent;

c. subjecting said more loaded scrubbing agent to at least one pressure reducing stage to obtain a gaseous phase therefrom;

d. subjecting a second fraction of said partially loaded scrubbing agent to at least one pressure-reducing stage to obtain reduced pressure liquid phase substantially free of hydrogen sulfide; and e. scrubbing said gaseous phase of step (c) with at least a fraction of liquid phase of step (d) to obtain a scrubbed substantially pure carbon dioxide stream and a scrubbing solution containing carbon dioxide and hydrogen sulfide.

Thus, in the process of this invention, the use of a stripping gas is omitted during the process step wherein the pure carbon dioxide is to be obtained. In this way, it is possible to obtain the carbon dioxide in a substantially pure form, e.g., at least 95%, preferably at least 98.5% by volume $CO_2$. This is of decisive importance for the manufacture of urea by synthesis from ammonia and carbon dioxide, since the thus-produced carbon dioxide can be directly reacted with the ammonia, prepared from the likewise formed hydrogen.

By enriched in $H_2$ is generally meant a hydrogen stream containing less than 1% of $CO_2$, preferably less stream than 100 ppm.

By substantially free of $H_2S$ in step (d) is generally meant less than about 20 ppm, preferably less than about 5 ppm of $H_2S$.

This invention is particularly applicable to the separation of $CO_2$ and $H_2$ from gases of about the following volumetric composition ranges.

| COMPONENT | % | PREFERRED % |
|---|---|---|
| $H_2$ | 45 – 70 | 55 – 65 |
| $CO_2$ | 25 – 45 | 28 – 35 |
| $H_2S$+COS | 0.05 – 1.5 | 0.3 – 1 |
| $N_2$ + Ar + CO + light hydrocarbons | 0 – 25 | 1 – 5 |

According to another aspect of the process of this invention, the carbon dioxide yield can be still further improved by branching off at least one partial stream (e.g. about 50–100%) from the liquid traveling downwardly in the $CO_2$ production column, warming this partial stream, and reintroducing same into the $CO_2$ column at a point lying somewhat therebelow. Suitably, the warming step is carried out in indirect heat exchange with thermally regenerated scrubbing agents, e.g. scrubbing agent being passed to the primary scrubbing step, and/or scrubbing agent withdrawn in the partially loaded condition from the primary scrubbing step and being cooled thereby to the required low temperature for further scrubbing of the raw gas.

The sump product of the $CO_2$ column containing substantially the entire hydrogen sulfide of the raw gas, and also residues of carbon dioxide is transferred, in accordance with another aspect of the process of this invention, to a stripping column and treated therein with a stripping gas, preferably nitrogen, introduced from the bottom. In this step, the concentration of the carbon dioxide in the liquid is further reduced. However, a certain amount of hydrogen sulfide is also thus converted into the gaseous phase. According to a still further aspect of the process of this invention, in order to keep the hydrogen sulfide in the liquid phase, the rising gaseous mixture is subjected to a secondary scrubbing step, with another part of the pressure-reduced, partially loaded scrubbing agent withdrawn from the second scrubbing stage. In this way, those minor amounts of $H_2S$ which were stripped out by the nitrogen are redissolved and concentrated in the liquid phase. This has the advantage that during the subsequent thermal regeneration of the scrubbing medium, which takes place conventionally by distillation and is not the subject of this invention, it is possible to obtain a highly concentrated of $H_2S$ fraction which can be fed to further process steps, e.g. in a Claus system. Of even greater importance, the thorough scrubbing of the $H_2S$ is intended for environmental protection purposes, since the residual gas from the secondary-wash stripping column is exhausted into the atmosphere and thus may contain only a few p.p.m. of $H_2S$.

According to a still further aspect of this invention, the liquid traveling downwardly in the secondary scrubbing section of the secondary-scrub stripping column is collected and combined in the lower part of the $CO_2$ column to the liquid present therein. In this way, the $CO_2$ dissolved in the secondary scrubbing step is also brought to the site of its production, which has a favorable effect on the carbon dioxide yield. In addition, it is thereby made possible to transfer the refrigeration values inherent in this liquid to the scrubbing media of the second and third stages and to utilize these cold-values at those locations.

Accoridng to still another aspect of this invention, it is possible to operate the $CO_2$ column at a higher pressure than the secondary-scrub stripping column, which improves the energy balance of the process, since the carbon dioxide can thus be discharged under a high pressure.

According to still another aspect of this invention, the secondary-scrub stripping column ca be operated in the secondary-scrub section, i.e. in the upper part, at a lower temperature, e.g. a differential of at least about 20° C, then in the lower part, i.e. the stripping section, which has a favorable effect on the solubility relationships of $CO_2$ and $H_2S$ and leads to a further increase in the quantity and quality of the products obtainable thereby.

The process of this invention can be applied to physical scrubbing media capable of absorbing $CO_2$ and $H_2S$ especially applicable being polar organic liquids, preferably alcohols and ketones such as methanol and acetone, and also N-methylpyrrolidone-methanol mixtures and dimethylformamide. In general, the primary scrubbing step of this invention is conducted at temperature below 0° C, preferably between −10° C and −30° C.

BRIEF DESCRIPTION OF THE DRAWING

The attached drawing is a schematic representation of the preferred comprehensive embodiment of this invention.

DESCRIPTION OF PREFERRED EMBODIMENT

The invention will be furthermore explained with reference to the drawing.

A scrubbing column 2 is fed, via conduit 1, with a raw gas of the composition set forth below under a pressure of 80 bars and at a temperature of 313 K, in an amount of 100,000 Nm³/h:

| | |
|---|---|
| $H_2$ | 60.62 mol-% |
| $N_2$ + Ar + $CH_4$ | 0.65 mol-% |
| CO | 2.67 mol-% |
| $CO_2$ | 34.97 mol-% |
| $H_2S$ | 1.09 mol-% |

In the scrubbing column 2, scrubbing media flow from above in three stages countercurrently to the raw gas, these media consisting essentially of methanol, the purity of which is, however, different in the individual stages. The purest methanol is introduced at the head of the scrubbing column, namely 100 tons/hour at a temperature of 214 K. Via conduit 3, under a pressure of 77.5 bars and at a temperature of 214 K, 63,542 Nm³/h. of scrubbed gas is withdrawn having the following composition:

| | | |
|---|---|---|
| $H_2$ | 94.87 | mol-% |
| $N_2$ + Ar + $CH_4$ | 0.98 | mol-% |
| CO | 4.15 | mol-% |
| $CO_2$ | 20 | p.p.m. |
| $H_2S$ | 0.1 | p.p.m. |

The scrubbing agent collecting in the uppermost scrubbing stage, which is preferably laden with $CO_2$, is withdrawn in its entirely through conduit 4, precooled in cooler 5, aftercooled in heat exchanger 6, and introduced via conduit 7 to the middle scrubbing section. In the latter, the scrubbing step is thus conducted with methanol partially laden with $CO_2$. In the middle scrubbing section, the methanol is futhermore enriched with $CO_2$. This methanol is discharged via conduit 8. A partial stream of 45 tons/hour is introduced via conduit 9 into the lowermost scrubbing section as the scrubbing medium, while another partial stream of 55 tons/hour with 20,976 Nm³/h. of impurities is expanded in the throttle 10 to a pressure of 27 bars and introduced into a separator 11. The methanol passing via conduit 9 into the lowermost scrubbing section is extensively laden with $CO_2$ and absorbs in this scrubbing section primarily the $H_2S$ contained in the raw gas. The laden scrubbing medium from the lowermost scrubbing stage (45 tons/hour with 17,520 Nm³/h. of impurities), having a temperature of 267 K, is discharged via conduit 12, expanded to a pressure of 27 bars in a throttle 13, and introduced into a separator 14.

The gases liberated in separators 11 and 24 are combined in conduit 15. 2,038 Nm³/h. of a gas having the following composition flows through this conduit:

| | | |
|---|---|---|
| $H_2$ | 44.4 | mol-% |
| $N_2$ + Ar + $CH_4$ | 0.8 | mol-% |
| CO | 2.2 | mol-% |
| $CO_2$ | 52.2 | mol-% |
| $H_2S$ | 0.4 | mol-% |

This mixture is compressed in compressor 16 to 80 bars and admixed to the raw gas in conduit 1.

The liquids collected in separators 11 and 14 are withdrawn via conduits 17 and 18, expanded in throttles 19 and 20 to a pressure of 3.5 bars, and introduced into a $CO_2$ column 21 at various points. In this column, the concentration and production of the $CO_2$ according to this invention are carried out. For this purpose, the gas rising in this column is scrubbed with 35 tons/hour of $H_2S$-free scrubbing medium fed via conduit 22. The gases ascending in the $CO_2$ column 21 are composed of the gases formed by expansion in the throttle 20 and of the gases entering the bottom of the column through conduit 23. In order to produce these last-mentioned gases, liquid is withdrawn from a flue plate present in the lower portion of column 21 via conduit 24, conveyed by means of a pump 25 through the heat exchangers 26 and 6, and reintroduced into the column via conduit 23. In heat exchangers 26 and 6, the liquid from the $CO_2$ column 21 cools the scrubbing media flowing to the uppermost section and to the middle section of the scrubbing column 2 and is warmed during this process, so that part of the components dissolved in the methanol is liberated and, via conduit 23, a gas-liquid mixture passes into the column 21.

The scrubbing medium fed to column 21 via conduit 17 can be fed to the column head at the very top, inasmuch as the gas liberated during the expansion in 19 is sufficiently pure $CO_2$ which no longer needs to be scrubbed. In the head of the $CO_2$ column 21 there is a temperature of 218 K. The gas discharged via conduit 27 (25,405 Nm³/h.) has the following composition:

| | | |
|---|---|---|
| $H_2$ | 1.34 | mol-% |
| $N_2$ + Ar + $CH_4$ | 0.14 | mol-% |
| CO | 0.12 | mol-% |
| $CO_2$ | 98.40 | mol-% |
| $H_2S$ | 2 | p.p.m. |

The cold inherent in the above gas is normally also transferred to the raw gas (not shown), so that the $CO_2$ product is then available at a temperature of 300 K and under a pressure of 3 bars.

From the sump of the $CO_2$ column 21, the liquid collected at that point is withdrawn via conduit 28 in an amount of 100 tons/hour and fed by means of a pump 29 into the lower portion of a secondary-wash stripping column 30. In this lower section, the downwardly flowing scrubbing liquid containing 1,841 Nm³h. of $H_2S$ and 7,232 Nm³/h. of $CO_2$ is treated with 4,000 Nm³/h. of nitrogen as the stripping gas, the latter having been fed into the lower part of the stripping section of column 30 via conduit 31 under a pressure of 3 bars and at a temperature of 313 K. The stripping gas liberates primarily $CO_2$ from the downwardly flowing scrubbing medium. The gas rising through the flue plate located approximately in the middle of the secondary-wash stripping column 30 is washed in the upper part of the secondary-wash stripping column 30 with 20 tons/hour of methanol; the latter, coming from the head of the $CO_2$ column 21, is expanded in a throttle 32 to a pressure of about 1.5 bars and enters the head of the secondary-wash stripping column 30 a temperature of about 211 K. The upper part of this column is under a pressure of about 1.5 bars. In this secondary wash section, those proportions of $H_2S$ which were liberated in the stripping section in accordance with their solubility are redissolved, namely 751 Nm³h., so that the residual gas withdrawn via conduit 33 from the head of column 30 is extensively freed of $H_2S$. Via conduit 33, 12,459 Nm³/h. of residual gas is discharged under a pressure of 1.5 bars, having the following composition:

| | | |
|---|---|---|
| $N_2$ + Ar + $CH_4$ | 31.80 | mol-% |
| CO | 0.02 | mol-% |
| $CO_2$ | 68.18 | mol-% |
| $H_2S$ | 5 | p.p.m. |

The gas has a temperature of about 211 K and is customarily brought, in heat exchange with raw gas (not shown), to a temperature of 300 K and then blown off into the atmosphere.

In the flue plate located in the middle of the secondary-wash stripping column 30, the entire descending liquid is collected, namely 20 tons/hour of methanol, which is withdrawn via conduit 34 and conveyed by means of a pump 35 into the lower flue plate of the $CO_2$ column 21. The liquid contains 1,886 Nm³/h. of $CO_2$ and 751 Nm³/h. of $H_2S$. In the lower flue plate of column 21, this methanol is mixed with the methanol flowing downwardy in column 21 and is conducted, on the one hand for utilizing the cold inherent therein and, on the other hand, for liberating $CO_2$, via the two heat exchangers 26 and 6 and reintroduced through conduit 23 into the column 21 at a temperature of 243 K.

From the sump of the secondary-wash stripping column 30, 100 tons/hour of methanol is withdrawn via conduit 36, containing 2,594 Nm³/h. of gas dissolved therein; this mixture is conveyed by means of a pump 37 into a methanol regenerating system 38 illustrated only schematically. This methanol regenerating feature is a conventional thermal regeneration and known in detail to a person skilled in the art; for this reason, an in-depth description of this feature can be omitted. In the methanol regeneration, 2,594 Nm³/h. of an $H_2S$ fraction is obtained, which is discharged under a pressure of 2.5 bars and at a temperature of 305 K and has the following composition:

| | |
|---|---|
| $N_2$ + Ar + $CH_4$ | 1.1 mol-% |
| $CO_2$ | 56.9 mol-% |
| $H_2S$ | 42.0 mol-% |

At the same time, the methanol regeneration yields 100 tons/hour of pure methanol, which is fed to the head of the scrubbing column 2 by means of a pump 40 and via a conduit 41 and is cooled along the way in the heat exchanger 26 to a temperature of 214 K.

The preceding examples can be repeated with similar success by substituting the generically or specifically descried reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the separation of substantially pure carbon dioxide and a gas enriched in hydrogen from a raw gas consisting essentially of carbon dioxide, hydrogen and hydrogen sulfide, the steps of:
    a. scrubbing said raw gas in a first scrubbing stage with a first fraction of partially loaded physical scrubbing agent to obtain a partially scrubbed raw gas and a more loaded scrubbing agent;
    b. scrubbing said partially scrubbed raw gas in a second stage with physical scrubbing agent to obtain a further scrubbed raw gas enriched in hydrogen and said partially loaded physical scrubbing agent;
    c. subjecting said more loaded scrubbing agent to at least one pressure reducing stage to obtain a gaseous phase therefrom;
    d. subjecting a second fraction of said partially loaded scrubbing agent to at least one pressure-reducing stage to obtain reduced pressure liquid phase substantially free of hydrogen sulfide; and
    e. scrubbing said gaseous phase of step (c) with at least a fraction of liquid phase of step (d) to obtain a scrubbed substantially pure carbon dioxide stream and a scrubbing solution containing carbon dioxide and hydrogen sulfide.

2. A process according to claim 1 wherein step (c) is conducted in two stages, the gaseous phase from the second stage being scrubbed in step (e).

3. A process according to claim 1 further comprising:
    f. withdrawing resultant scrubbing solution containing carbon dioxide and hydrogen sulfide from step (e), and stripping said scrubbing solution with nitrogen to strip out a gas containing additional $CO_2$ and $H_2S$ from said scrubbing solution.

4. A process according to claim 2 further comprising:
    f. withdrawing resultant scrubbing solution containing carbon dioxide and hydrogen sulfide from step (e), and stripping said scrubbing solution with nitrogen to strip out a gas containing additional $CO_2$ and $H_2S$ from said scrubbing solution.

5. A process according to claim 3 further comprising:
    g. scrubbing said gas from step (f) containing additional $CO_2$ and $H_2S$ with a physical scrubbing agent to lower the concentration of $H_2S$ in said gas to not more than about 5 parts per million of $H_2S$.

6. A process according to claim 3 wherein prior to stripping resultant scrubbing solution, at least a partial stream thereof is indirectly heat exchanged against thermally regenerated physical scrubbing agent to cool the latter.

7. A process according to claim 3 wherein prior to stripping resultant scrubbing solution, at least a partial stream thereof is indirectly heat exchanged against thermally regenerated physical scrubbing agent to cool the latter against said physical scrubbing agent employed in step (b).

8. A process according to claim 3 wherein prior to stripping resultant scrubbing solution, at least a partial stream thereof is indirectly heat exchanged against thermally regenerated physical scrubbing agent to cool the latter and is also indirecty heat exchanged against said physical scrubbing agent employed in step (b).

9. A process according to claim 4, further comprising (g) branching off at least a part of the liquid obtained in step (e), heating it and reuniting it with the main stream prior to stripping it in step (f).

10. A process according to claim 5 wherein said physical scrubbing agent employed in step (g) is another fraction of said liquid phase obtained in step (d).

11. A process according to claim 10 wherein step (g) is conducted under a lower temperature than step (e).

12. A process according to claim 5 wherein step (g) is conducted at a lower temperature than step (f).

13. A process according to claim 11 wherein step (g) is conducted at a lower pressure than step (f).

14. A process according to claim 5 further comprising combining resultant loaded physical scrubbing agent obtained in step (g) with said scrubbing solution obtained in step (e).

15. A process according to claim 1, said physical scrubbing agent being methanol.

16. A Process according to claim 1 wherein the scrubbed raw gas enriched in hydrogen in step (b) contains less than 100 ppm of $CO_2$, and the reduced pressure liquid phase is substantially free of hydrogen sulfide and step (d) contains less than 5 ppm of $H_2S$.

17. A process according to claim 1 wherein the raw gas contains in percent by volume 45–70% hydrogen, 25–24% carbon dioxide, 0.05–1.5% of hydrogen sulfide plus carbonyl sulfide and 0–25% of nitrogen plus argon plus carbon monoxide plus light hydrocarbons.

18. A process according to claim 1 wherein the raw gas has a volumetric composition of 55–65% hydrogen, 28–35% carbon dioxide, 0.3–1% of hydrogen sulfide plus carbonyl sulfide, and 1–5% of nitrogen plus argon plus carbon monoxide plus light hydrocarbons.

19. A process according to claim 12 wherein step (h) is conducted at a temperature at least 20° C lower than step (g).

20. A process according to claim 1 wherein said fraction in step (d) is expanded in two pressure-reducing stages in order to obtain said reduced pressure liquid phase substantially free of hydrogen sulfide 21. A process according to claim 20 wherein the gaseous phase formed during the first expansion stage is recompressed and recycled to the raw gas for treatment in step (a).

22. Apparatus for the separation of substantially pure carbon dioxide and a gas enriched in hydrogen from a raw gas consisting essentially of carbon dioxide, hydrogen and hydrogen sulfide, comprising a three-stage scrubbing column and a $CO_2$ column, wherein the lowermost scrubbing stage of the scrubbing column is in communication with the lower part of thw $CO_2$ column and the middle scrubbing stage of the scrubbing column is in communication with the upper part of the $CO_2$ column, the bottom of the $CO_2$ column (21) being connected with the middle part of a secondary-wash stripping column (30), the head of the latter being, in turn, connected with a conduit (22) to the head of the $CO_2$ column, the latter being further provided with a discharge conduit (27) for pure carbon dioxide.

23. Apparatus according to claim 22, further comprising a condiut (24) discharging from the lower part of the $CO_2$ column (21), said conduit extending via a cross section of a heat exchanger (26) back to the lower part of the $CO_2$ column (21).

24. Apparatus according to claim 23, wherein the other cross section of the heat exchanger (26) is in communication with the uppermost scrubbing stage.

25. Apparatus according to claim 23, said conduit (24) also transversing a cross section of a second heat exchanger (6).

26. Apparatus according to claim 25, wherein the other cross section of the second heat exchanger (6) is in communication with the scrubbing column (20.

27. Apparatus according to claim 22, further comprising another conduit (34) leading from a middle section of a secondary-wash stripping column (30) to the lower end of the $CO_2$ column (21).

* * * * *

UNITED STATES PATENT AND TRADEMARK OFFICE
CERTIFICATE OF CORRECTION

PATENT NO. : 4,050,909
DATED : September 27, 1977
INVENTOR(S) : GERHARD RANKE

It is certified that error appears in the above-identified patent and that said Letters Patent are hereby corrected as shown below:

The address for the Assignee should read

--- Wiesbaden, Germany ---.

Claim 9, Col. 8, line 33: "(g)" should read -- (h) --.

Claim 17, Col. 8, line 58: "25-24%" should read -- 25-45% --.

Claim 19, Col. 8, line 66: "(h)" should read -- (g) --.

Claim 19, Col. 8, line 69: "(g)" should read -- (f) --.

Claim 26, Col. 10, line 18: "column (20." should read
-- column (2). --.

Signed and Sealed this

Fourteenth Day of March 1978

[SEAL]

Attest:

RUTH C. MASON
Attesting Officer

LUTRELLE F. PARKER
Acting Commissioner of Patents and Trademarks